United States Patent

Gaman

[11] Patent Number: 5,538,174
[45] Date of Patent: Jul. 23, 1996

[54] EXOTHERMIC RAIL BOND FIXTURE

[75] Inventor: Nicolae Gaman, Nuenen, Netherlands

[73] Assignee: Erico Internatoinal Corp., Solon, Ohio

[21] Appl. No.: 421,406

[22] Filed: Apr. 13, 1995

[30] Foreign Application Priority Data

Apr. 14, 1994 [GB] United Kingdom .................. 9407361

[51] Int. Cl.$^6$ ..................................................... B23K 3/04
[52] U.S. Cl. ........................ 228/44.7; 228/234.3; 164/54
[58] Field of Search ............................... 228/234.3, 44.7; 164/54

[56] References Cited

U.S. PATENT DOCUMENTS

| 2,275,367 | 3/1942 | James | 173/273 |
| 2,387,715 | 10/1945 | Cadwell | 228/234.3 X |
| 2,401,048 | 5/1946 | Cadwell | 164/54 X |
| 4,716,272 | 12/1987 | Blad et al. | 219/129 |
| 5,279,455 | 1/1994 | Fuchs | 228/234.3 |

FOREIGN PATENT DOCUMENTS

| 0526362 | 2/1993 | European Pat. Off. . |
| 2506235 | 11/1982 | France . |
| 2047456 | 5/1971 | Germany . |
| 552378 | 4/1943 | United Kingdom . |
| 1412368 | 11/1975 | United Kingdom . |
| 2065528 | 7/1981 | United Kingdom . |
| 2243028 | 10/1991 | United Kingdom . |

Primary Examiner—Kenneth J. Ramsey
Attorney, Agent, or Firm—Renner, Otto, Boisselle & Sklar

[57] ABSTRACT

A fixture for forming electrical connections to rail and the like includes a narrow elongated template plate operative to be positioned on and secured to a rail, and to locate an electrical connection with respect to the rail. The fixture has a parallel clamp plate spaced from the template plate forming an opening between the plates. A toggle on the clamp plate is connected to a plunger. The toggle when locked positions the plunger to enable a refractory mold to be positioned against the electrical connection, and when open permits a spring to press the plunger to press the mold against the connection, and the connection in turn against the rail. The fixture has two permanent magnets, one at each end of the template plate, which can quickly be released by applying a force to the top of the fixture from the side.

15 Claims, 3 Drawing Sheets

EXOTHERMIC RAIL BOND FIXTURE

DISCLOSURE

This invention relates generally as indicated to an electrical bond, and more particularly to an electrical connection to steel structures such as rails. The invention also relates to the clamp or fixture to facilitate the connection to a rail.

BACKGROUND OF THE INVENTION

This invention relates to improvements in electrical connections to rail and the like, and more particularly to certain improvements in the connection, system, and clamps shown in prior United Kingdom application Serial No. 9317807.7, filed Aug. 27, 1993.

In such prior application there is shown a method of brazing a copper block to the rail by clamping a refractory mold or crucible against the block, igniting an exothermic material within the mold, with the heat created passing through a heat transmitting wall of the mold, and the block to elevate the temperature of brazing materials positioned between the block and rail. The block is provided with one or more holes, some of which may be tapped to enable an electrical connection readily to be made to the block and thus the rail. The reaction products of the high heat producing exothermic materials are contained in the mold or crucible which may be cleaned out and used again, or disposed of with the mold or crucible.

In such prior application two types of clamps are illustrated, one being a spring clamp which clamps under the rail, and the other a complex toggle. Both require a number of adjustments or preparations in order to be used properly. Both at times could use a person with more than two hands. They are time consuming and awkward to handle, set up, and install. All of this is complicated by the fact that the rail surface has to be prepared and that the block should be precisely located on the rail. A further complication is that the connections are often made or repaired under traffic, or between trains which can be frequent.

It is accordingly important to have a clamp for such a system which requires minimal or no adjustment, which can precisely locate the block with respect to the rail, and which can be attached to the rail quickly, yet also released quickly, for traffic clearance, for example. It is of course desirable that the clamp not go under the rail which would require dislocation of the ballast. It is, however, most important that for each installation a uniform ideal pressure be obtained between the mold, copper block and rail.

SUMMARY OF THE INVENTION

A fixture for forming electrical connections to rail and the like includes a narrow elongated template plate operative to be positioned on and secured to a rail, and to locate an electrical connection with respect to the rail. The fixture has a parallel clamp plate spaced from the template plate forming an opening between the plates with a toggle on the clamp plate operating a spring loaded movable plunger. An electrical connection may be positioned against said rail and the like located by the template plate. The toggle when locked opens the plunger against the pressure of a spring to enable a refractory mold to be positioned properly against the electrical connection, and when released to permit the spring loaded plunger to press the mold against the connection and the connection in turn against the rail. The pressure of the spring may be adjusted by a nut threaded on the plunger. A load distribution plate is provided on the lid of the mold.

The fixture has two permanent magnets, one at each end of the template plate, which can quickly be released by applying a force to the top of the fixture from the side. The magnets are mounted in tubular columns which join the template plate or base and the parallel clamp plate. The magnets project through the template plate and are flush with or just proud of the bottom of the template plate, which is positioned against the rail and the like. The edge of the template plate where the connection is located may undercut so the plate will not attach to the rail. The shape of the template plate may readily be altered to fit rail of different size or replace worn edges.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
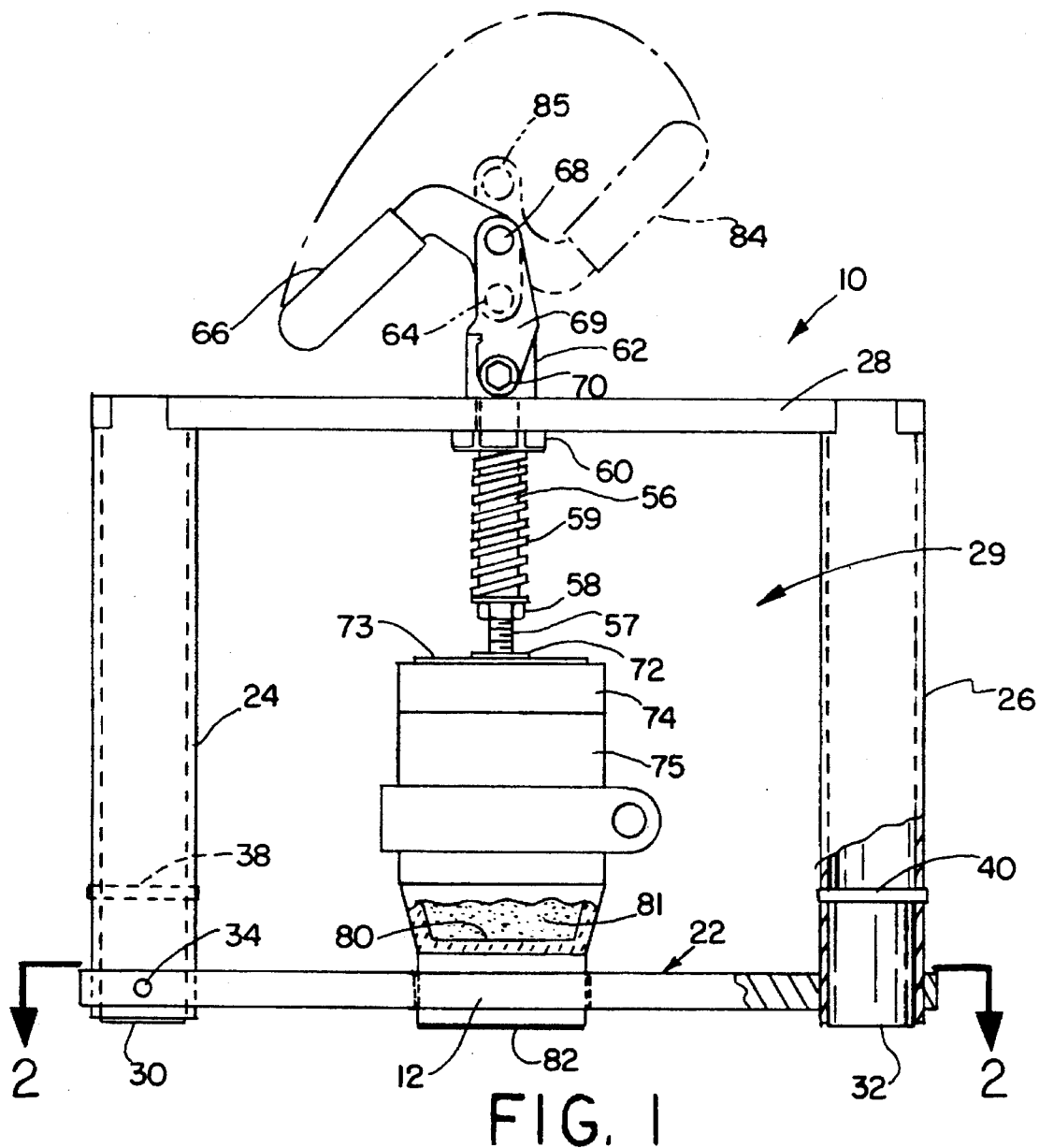
FIG. 1 is a front elevation partially broken away and in section of an electrical connection fixture in accordance with the present invention.
Figure 2:
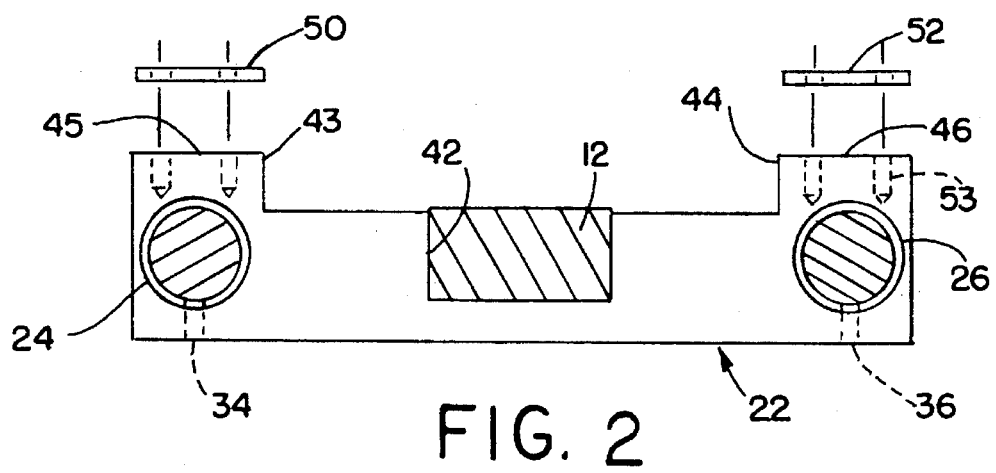
FIG. 2 is horizontal section on a somewhat reduced scale showing the template plate in place as taken from the line 2—2 of FIG. 1, and also showing removable dimensional shims or edges.
Figure 3:
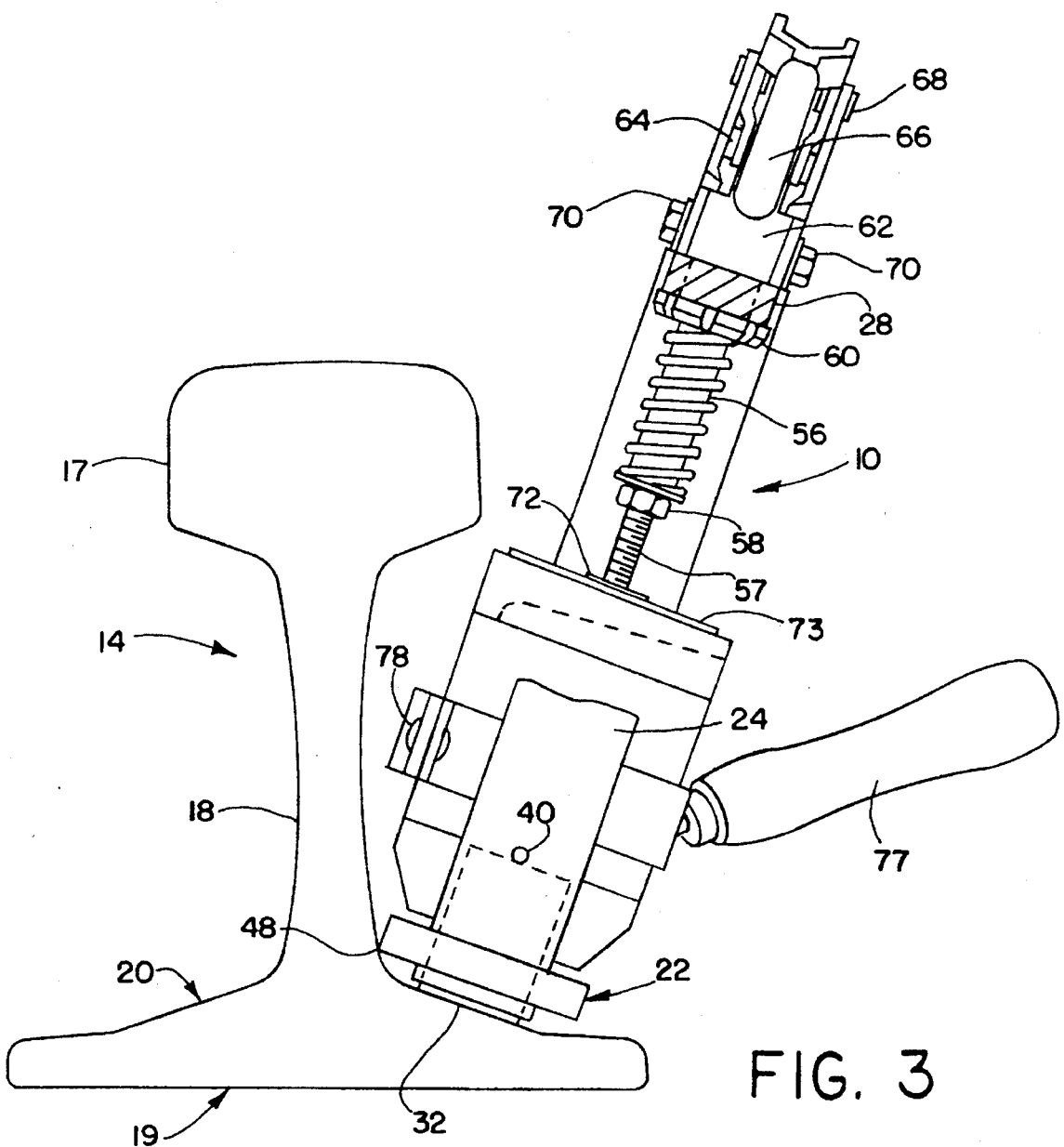
FIG. 3 is a somewhat enlarged transverse rail section showing the fixture partially broken away applied to the base of a rail.

Referring initially to FIGS. 1, 2 and 3 it will be seen that there is provided a fixture shown generally at 10 which is employed to form an electrical connection 12 on rail 14. The connection may be in the form of a copper block as seen more clearly in FIG. 4 or the prior mentioned application, and such block may be provided with one or more tapped holes such as seen at 15.

Figure 4:
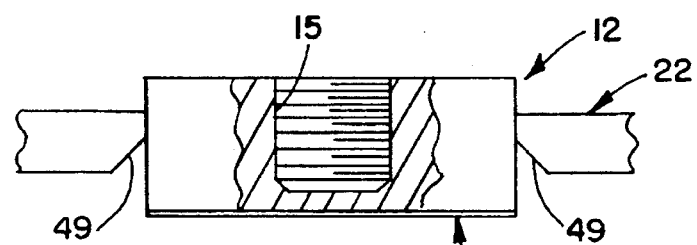
FIG. 4 is a fragmentary section of the template plate indicating how the edge at the connection may be undercut.

As seen more clearly in FIG. 4, the rail includes a head 17, a web 18, and a base 19. The top of the base includes a flat sloping surface seen generally at 20. In the illustrated embodiment, it is to such surface 20 that the electrical connection is made. However, it will be appreciated that the fixture of the present invention may also apply the electrical connection to the web 18 or to one side of the head 17.

The fixture itself comprises a bottom or template plate 22. The template plate is elongated and relatively narrow. At each end the template plate has secured thereto tubular columns 24 and 26 which support a somewhat more narrow clamp plate 28 which extends spaced from yet parallel to the template plate 22, forming opening or window 29. The tubular columns projects slightly below the template plate and within such columns permanent magnets 30 and 32 project downwardly just proud of the end of the tubular column. The magnets are in the form of cylindrical rods and may be held in place by set screws seen at 34 and 36. The magnets are inserted in the lower ends of the tubular columns against the transverse stop pins 38 and 40.

In the center, the template plate 22 has a rectangular cutout indicated at 42 into which the copper block or connection is positioned both for location with regard to the fixture and the rail. Each end of the template plate on the inside is provided with a projection as seen at 43 and 44. The respective linear gauge edges 45 and 46 abut the rail web as seen at 48 in FIG. 3, properly positioning the template plate 22 with respect to the rail base and more particularly the flat surface 20. This then positions the cutout 42 and of course the block in such cutout in the proper location not only with respect to the fixture but also to the rail. As seen in FIG. 4, the underside of the edge of the cutout 42 is relieved or undercut at 49. This spaces the bottom of the plate from the brazing material.

As seen in FIG. 2, the dimension of the projections 43 and 44 may be enlarged by adding position blocks 50 and 52. These position blocks may readily be secured to the projecting edges by recessed fasteners in the tapped holes illustrated at 53. Accordingly, the profile of the template plate may readily be modified as a gauge for special or different size rail.

Mounted on the clamp plate 28 is a vertically movable plunger 56, the lower end of which is threaded as seen at 57. A nut 58 threaded on the lower end provides a movable abutment for one end of compression spring 59, the opposite abutment being the boss 60 on the underside of the plate 28. The plunger 56 extends upwardly through the boss, through the plate, and through sleeve 62 and terminates at pin connection 64. A J-shape toggle handle seen at 66 is also pivoted at its short end to such pin and also at 68 between the top of links 69. The lower end of the links 69 are pivoted at 70 on each side of the sleeve 62.

The lower end of the plunger is provided with a pressure contact plate seen at 72 which is adapted to press down on a larger pressure contact plate 73 on lid 74 of refractory mold 75. The refractory mold is provided with a handle 77 which is releasably clamped around the mold as indicated at 78. The lower end of the refractory mold interfits with the block 12 and is provided with a heat transmitting wall seen at 80 so that when the exothermic reaction materials 81 within the mold are ignited the heat formed by the exothermic reaction will be transmitted through the wall, through the block 12, and to brazing materials 82 positioned on the bottom of block 12 between the block and rail.

In operation, the toggle handle 66 is moved to the phantom line position 84 seen in FIG. 1 which elevates the pivot 64 or the top of the plunger to the position seen at 85. This raises the plunger compressing the spring 59. The pivot 64 at the top of the plunger in the position 85 moves slightly over center between the pivots 68 and 70 and accordingly, the plunger is locked in its up position. This then enables the mold and block to be positioned in the window of the fixture. Upon releasing the handle by moving in the counter clockwise direction seen in FIG. 1, the spring simply pushes the plate 72 down against the plate of the mold at the pressure controlled by the position of the nut 58. In this manner, a selected pressure can be achieved and repeated for each connection made. In the full line or down position, the toggle is not locked, but simply loose.

Figure 5:
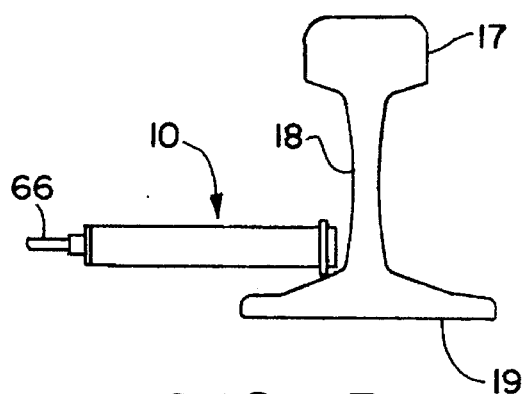
FIG. 5, 6 and 7 illustrate how the fixture may be positioned on or removed from the rail.
Figure 6:
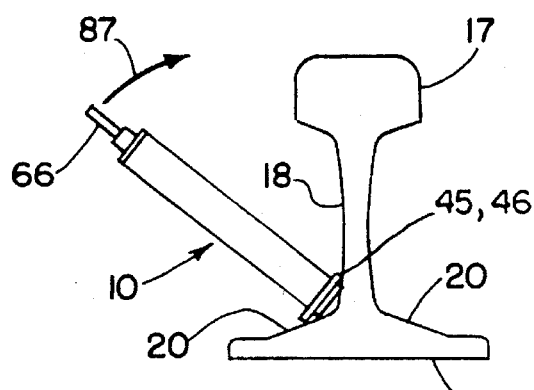
Figure 7:
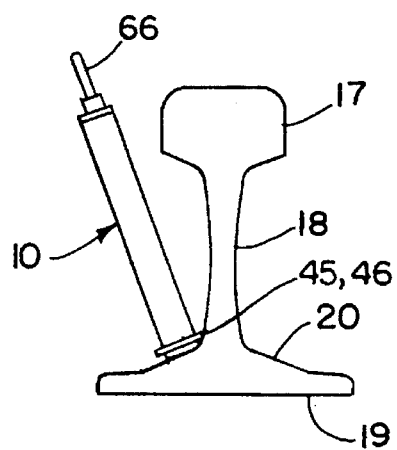

Referring now to FIGS. 5, 6 and 7, it will be seen that the fixture may quickly be positioned properly with respect to the rail. The fixture as seen in FIG. 10 is simply laid horizontally on top of the rail base and then raised in the direction of the arrow 87 seen in FIG. 6. As the fixture is raised the gauge edges 45 and 46 will contact the web 18 of the rail guiding the fixture to the proper location and position seen in FIG. 7. The permanent magnets which are preferably samarium-cobalt magnets will hold the fixture firmly in place as seen in FIG. 7 while the block or connection and mold are positioned at the location dictated by the template plate. The toggle handle is then simply released to cause the plunger to press down on the mold and thus on the connection at the predetermined pressure. With the fixture in the position seen in FIG. 7, it can readily be removed by pulling or forcing the top to the left as seen in FIG. 7 breaking the grip of magnets. Accordingly, if a train is coming the fixture can readily be knocked over to the position as seen in FIG. 5 even though such magnets exert a strong grip in the FIG. 7 position, well more than is required to counteract the pressure of the spring.

It can now be seen that there is provided a rail bond connection and fixture which is independent of the profile of the rail and yet very easy to position. There is no need to clamp beneath the rail and the clamp may readily be modified for special rail simply by adding or subtracting the position locks. The fixture more importantly provides a preselected ideal pressure between the mold, the copper block and the rail which can be repeated for each connection.

With the template plate, the copper block connection is properly located both with respect to the fixture and with respect to the rail. The copper block always remains parallel with the braze or flat surface of the rail-base because the clamp in effect copies the rail braze surface 20. With the shims or edge additions 50 and 52 it is possible to replace parts which are mostly exposed to wear and tear as well as to adapt the fixture for special rail. In case of emergency or short notice, the fixture can very easily be removed simply by forcing it over or away from the rail as seen in the FIG. 7 position. The tubular columns provide a moment arm sufficient readily to release the magnets.

Although the fixture is shown applying a connection to the base of the rail, the same fixture may be used to apply a connection to the web or to one side of the head of the rail. In the illustrated embodiment, the diameter of the magnets is approximately 25 mm, which is the same width as the copper block of the connection. Accordingly, as long as the rail has a flat section of the same width dimension, then the fixture may be attached. The fixture of the present invention has also been found to work well even though the rail is rusted or corroded. In any event, upon releasing the spring with the toggle, a more than adequate contra-force is created through the magnets to stabilize the system.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A fixture for forming electrical connections to rail and the like comprising a template plate operative to be positioned on and secured to a rail, and to locate an electrical connection with respect to the rail, a clamp plate spaced from said template plate and forming an opening between said plates, and movable clamp means on said clamp plate movable toward and away from said template plate, whereby an electrical connection may be positioned against said rail and the like located by said template plate, said clamp means when open being positioned to enable a refractory mold to be positioned within said opening against said electrical connection, and when closed to press the mold against the connection and the connection in turn against the rail.

2. A fixture as set forth in claim 1 wherein said clamp means includes a plunger, and a compression spring urging said plunger toward said template plate.

3. A fixture as set forth in claim 2 including means to adjust the pressure of said spring.

4. A fixture as set forth in claim 2 including a toggle operative to retract said plunger and lock the plunger in retracted position.

5. A fixture as set forth in claim 1 including permanent magnets operative to hold said fixture to the rail.

6. A fixture as set forth in claim 5 wherein said template plate is long and narrow, and said magnets are positioned at each end of said template plate.

7. A fixture as set forth in claim 6 including tubular columns joining said template and clamp plates at each end, said magnets being mounted in said columns and extending just proud of the template plate.

8. A fixture as set forth in claim 7 wherein said magnets are cylindrical samarium-cobalt magnets.

9. A fixture as set forth in claim 7 wherein said tubular columns project just proud of the bottom of the template plate, and said magnets project just proud of said tubular columns.

10. A fixture as set forth in claim 9 wherein said tubular columns have sufficient height to provide enough movement arm to release said magnets by exerting a lateral force on the top of the fixture.

11. A fixture as set forth in claim 1 wherein said template plate includes a cutout to receive said connection, and gauge edges to align and locate the cutout.

12. A fixture as set forth in claim 11 including means to change the location of the gauge edges with respect to said cutout.

13. A fixture as set forth in claim 12 wherein the edges of the template plate are under cut around the cutout.

14. A fixture as set forth in claim I wherein said clamp means includes a plunger, a pressure distributing plate on the lower end of said plunger, a refractory mold for containing exothermic material having a lid, and a pressure plate on said lid adapted to engage the plate on the plunger.

15. A fixture as set forth in claim 14 wherein said connection is a copper block having brazing material positioned between it and the rail, said plunger pressing the mold against the block so that the heat from the exothermic materials will be transmitted through the mold and block to braze the block to the rail.

* * * * *